United States Patent
Itoguchi et al.

(10) Patent No.: US 10,011,667 B2
(45) Date of Patent: Jul. 3, 2018

(54) METHOD FOR PRODUCING POLYOLEFIN

(71) Applicant: Sumitomo Chemical Company, Limited, Tokyo (JP)

(72) Inventors: Satoshi Itoguchi, Ichihara (JP); Hitoshi Shibashita, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/483,075

(22) Filed: Apr. 10, 2017

(65) Prior Publication Data

US 2017/0291970 A1  Oct. 12, 2017

(30) Foreign Application Priority Data

Apr. 12, 2016  (JP) .................................. 2016-079366

(51) Int. Cl.
| | |
|---|---|
| *C08F 2/00* | (2006.01) |
| *C08F 110/06* | (2006.01) |
| *C08F 110/02* | (2006.01) |
| *C08F 210/02* | (2006.01) |
| *C08F 210/06* | (2006.01) |
| *C08F 2/34* | (2006.01) |
| *C08F 10/02* | (2006.01) |
| *C08F 10/06* | (2006.01) |

(52) U.S. Cl.
CPC .............. *C08F 110/06* (2013.01); *C08F 2/34* (2013.01); *C08F 10/02* (2013.01); *C08F 10/06* (2013.01); *C08F 110/02* (2013.01); *C08F 210/02* (2013.01); *C08F 210/06* (2013.01)

(58) Field of Classification Search
CPC .... C08F 110/06; C08F 110/02; C08F 210/02; C08F 210/06; C08F 2/34; C08F 2/38; C08F 10/06; C08F 10/02
USPC .......................................................... 526/68
See application file for complete search history.

(56) References Cited

U.S. PATENT DOCUMENTS

| | | | |
|---|---|---|---|
| 5,616,661 A | 4/1997 | Eisinger et al. | |
| 2004/0138391 A1 | 7/2004 | Burdett et al. | |
| 2012/0136127 A1 | 5/2012 | Hussein et al. | |

FOREIGN PATENT DOCUMENTS

| | | | |
|---|---|---|---|
| EP | 2913345 A1 * | 9/2015 | |
| JP | H04085307 A | 3/1992 | |
| JP | H04085308 A | 3/1992 | |
| JP | H04085309 A | 3/1992 | |
| JP | H06001804 A | 1/1994 | |
| JP | H06199915 A | 7/1994 | |
| JP | H060248020 A | 9/1994 | |
| JP | H08283317 A | 10/1996 | |
| JP | H0995509 A | 4/1997 | |
| JP | H09095503 A | 4/1997 | |
| JP | 2005220235 A | 8/2005 | |
| JP | 2007231257 A | 9/2007 | |

OTHER PUBLICATIONS

Extended European Search Report dated Aug. 10, 2017 in EP Application No. 17165842.0.

* cited by examiner

*Primary Examiner* — William K Cheung
(74) *Attorney, Agent, or Firm* — Panitch Schwarze Belisario & Nadel LLP

(57) ABSTRACT

A method for producing a polyolefin is provided. The method includes a step of feeding a polyolefin powder having a catalytic activity into a gas phase polymerization vessel in which there is a polyolefin powder and through which a gas comprising an olefin is being circulated, thereby commencing polymerization of an olefin. The following formula (1) is satisfied:

$$0.5 < \beta/(\alpha B) < 24.0 \qquad (1)$$

In formula (1), $\alpha$ represents the median diameter (μm) of the catalytically active polyolefin powder to be fed into the vapor phase polymerization vessel, $\beta$ represents the median diameter (μm) of the polyolefin powder that is contained in the vapor phase polymerization vessel before the feeding of the catalytically active polyolefin powder into the vapor phase polymerization vessel, and B represents the linear gas velocity (m/sec) of the gas containing an olefin within the vapor phase polymerization vessel.

4 Claims, No Drawings

METHOD FOR PRODUCING POLYOLEFIN

TECHNICAL FIELD

The present invention relates to a method for producing a polyolefin using a vapor phase polymerization vessel.

BACKGROUND ART

In the production of a polyolefin by a vapor phase polymerization method using a catalyst, poor dispersion of the catalyst is prone to be caused in a vapor phase reaction vessel at the commencement of vapor phase polymerization, and lumps of a polyolefin are prone to be formed due to excessive advance of polymerization at a site where the catalyst concentration has locally become high. If lumps of a polyolefin are formed, then the lumps could occlude a drawing port when drawing the generated polyolefin from the vapor phase polymerization vessel.

As a means for solving such a problem, there is known a method in which a polyolefin powder called "seed powder" is fluidized within a gas phase polymerization vessel before commencing vapor phase polymerization, and then feedstock monomers and a catalyst are fed thereto to commence polymerization (see, for example, Patent Document 1). The seed powder and the catalyst are charged in the vapor phase polymerization vessel due to their friction, etc. and therefore the catalyst is prone to attach to the seed powder due to electrostatic force, and the catalyst attached to the seed polymer is dispersed as the seed powder flows. This is presumed to inhibit the catalyst concentration from locally becoming high and successfully suppress the generation of lumps.

PRIOR ART DOCUMENTS

[Patent Document 1] JP-A-6-1804

SUMMARY OF THE INVENTION

Problems to Be Solved by the Invention

When the polyolefin powder to be fed into a vapor phase polymerization vessel is a catalytically active polyolefin powder prepared in a polymerization vessel different from the vapor phase polymerization vessel, the catalytically active polyolefin powder is the same type as the seed polymer and both of them come to have the same polarity, and therefore the dispersion of the catalytically active polyolefin powder owing to electrostatic attachment cannot be expected. Therefore, the generation of lumps at the commencement of vapor phase polymerization cannot be suppressed sufficiently by the above method.

Under such a situation, it is an object of the present invention to provide a method for producing a polyolefin comprising a step of commencing the polymerization of an olefin by feeding a catalytically active polyolefin powder into a vapor phase polymerization vessel, in which method generation of lumps of a polyolefin powder within the vapor phase polymerization vessel is suppressed during a period from the commencement of the polymerization and the arrival at stable operation, and vapor phase polymerization is commenced without causing such problems as occurrence of defective discharge of a polyolefin powder.

Means for Solving the Problems

The present invention relates to a method for producing a polyolefin, comprising a step of feeding a catalytically active polyolefin powder into a vapor phase polymerization vessel which contains a polyolefin powder and through which a gas containing an olefin is being circulated, thereby commencing polymerization of an olefin, wherein the following formula (1) is satisfied:

$$0.5 < \beta/(\alpha B) < 24.0 \tag{1}$$

in the above formula (1),

α represents the median diameter (unit: μm) of the catalytically active polyolefin powder to be fed into the vapor phase polymerization vessel, β represents the median diameter (unit μm) of the polyolefin powder that is contained in the vapor phase polymerization vessel before the feeding of the catalytically active polyolefin powder into the vapor phase polymerization vessel, and B represents the linear gas velocity (unit: m/sec) of the gas containing an olefin within the vapor phase polymerization vessel.

Advantageous Effects of the Invention

According to the present invention, in a method for producing a polyolefin comprising a step of commencing the polymerization of an olefin by feeding a catalytically active polyolefin powder into a vapor phase polymerization vessel, generation of lumps of a polyolefin powder within the vapor phase polymerization vessel can be suppressed since the commencement of the polymerization and before arrival at stable operation and vapor phase polymerization can be commenced without causing such problems as occurrence of defective discharge of an olefin powder.

Mode for Carrying out the Invention

The method for producing a polyolefin of the present invention is a method comprising a step of feeding a catalytically active polyolefin powder into a gas phase polymerization vessel which contains a polyolefin powder and through which a gas containing an olefin is being circulated, and thereby commencing polymerization of an olefin, wherein the following formula (1) is satisfied:

$$0.5 < \beta/(\alpha B) < 24.0 \tag{1}$$

in the above formula (1),

α represents the median diameter (unit: μm) of the catalytically active polyolefin powder to be fed into the vapor phase polymerization vessel, β represents the median diameter (unit: μm) of the polyolefin powder that is contained in the vapor phase polymerization vessel before the feeding of the catalytically active polyolefin powder into the vapor phase polymerization vessel, and B represents the linear gas velocity (unit: m/sec) of the gas containing an olefin within the vapor phase polymerization vessel.

In the present invention, the polyolefin may be produced by polymerizing an olefin by only the vapor phase polymerization or alternatively may be produced by polymerizing an olefin by a combination of a vapor phase polymerization method with a bulk polymerization method or the solvent polymerization method.

Examples of the vapor phase polymerization vessel for performing vapor phase polymerization include a vapor phase fluidized bed reactor and a horizontal vapor phase reactor. In the present invention, a vapor phase fluidized bed reactor is preferred. Examples of the vapor phase fluidized bed reactor include the vapor phase fluidized bed reactors described in JP-A-58-201802, JP-A-59-126406, JP-A-2-233708, JP-A-4-234409, or JP-A-7-62009.

Vapor phase polymerization is performed within a vapor phase polymerization vessel through which a gas containing an olefin is circulating. The gas containing an olefin is introduced into a vapor phase polymerization vessel at its bottom, then discharged from the vapor phase polymerization vessel at its top, and then introduced into the vapor phase polymerization vessel at its bottom again via a circulating gas line, and thus, the gas circulates on such a route. In order that the concentration of the olefin contained in the gas containing an olefin that is introduced into the vapor phase polymerization vessel at its bottom may become a desired value, an olefin is fed to a circulating gas line, etc.

Usually, the vapor phase fluidized bed reactor has a cylindrical form and is arranged with its longitudinal direction coincident with the vertical direction, and the vapor phase fluidized bed reactor arranged with its longitudinal direction coincident with the vertical direction is provided, at its interior lower part, with a gas dispersion plate. In one embodiment, the vapor phase fluidized bed reactor having a cylindrical body has, at an end thereof, a radius reduction part whose radius decreases closer to the tip of the part. When the vapor phase polymerization vessel is a vapor phase fluidized bed reactor, a seed powder described below and a catalytically active polyolefin powder fed into the vapor phase polymerization vessel are fluidized in the vapor phase polymerization vessel by the gas containing an olefin introduced into the vapor phase polymerization vessel at its bottom, so that a fluidized bed is formed in a region above the dispersion plate. The gas containing an olefin passes through the gas dispersion plate provided at the lower part of the vapor phase polymerization vessel and is introduced into the region above the gas dispersion plate, so that the fluidized bed is fluidized efficiently.

In the solvent polymerization method, an inert solvent, such as hexane, heptane, octane, decane, cyclohexane, methylcyclohexane, benzene, toluene, and xylene, is used. Examples of the polymerization vessel in which the bulk polymerization method or the solvent polymerization method is performed include a stirred vessel reactor and a loop reactor.

In the present invention, the apparatus for producing a polyolefin may include only one vapor phase polymerization vessel or alternatively may include two or more vessels. When the apparatus for producing a polyolefin includes two or more vapor phase polymerization vessels, the formula (1) is satisfied in all the vapor phase polymerization vessels to which a catalytically active polyolefin powder is fed.

The apparatus for producing a polyolefin may include a polymerization vessel other than vapor phase polymerization vessels. Examples of the polymerization vessel other than vapor phase polymerization vessels include a polymerization vessel for performing the bulk polymerization method or the solvent polymerization method.

In the present invention, when the apparatus for producing a polyolefin includes a plurality of polymerization vessels, the polymerization vessels may be tandem arranged or alternatively may be arranged in parallel.

In the present invention, the apparatus for producing a polyolefin is preferably an apparatus that includes two or more vessels tandem arranged and has at least one vapor phase polymerization vessel as the second or more downstream vessel.

The method for producing a polyolefin of the present invention satisfies the following formula (1), $$0.5<\beta/(\alpha B)<24.0 \quad (1)$$

in the above formula (1),

α represents the median diameter (unit: μm) of the catalytically active polyolefin powder to be fed into the vapor phase polymerization vessel, β represents the median diameter (unit: μm) of the polyolefin powder that is contained in the vapor phase polymerization vessel before the feeding of the catalytically active polyolefin powder into the vapor phase polymerization vessel, and B represents the linear gas velocity (unit: m/sec) of the gas containing an olefin within the vapor phase polymerization vessel.

The ratio $\beta/(\alpha B)$ is preferably greater than 1.0, more preferably greater than 2.0, and even more preferably greater than 4.0. The ratio $\beta/(\alpha B)$ is preferably less than 20.0, more preferably less than 15.0, and even more preferably less than 12.0.

The polyolefin powder that is present within the vapor phase polymerization vessel before the feeding of the catalytically active polyolefin powder into the vapor phase polymerization vessel may or may not have catalytic activity. Hereinafter, a polyolefin powder that is present within a vapor phase polymerization vessel before the feeding of the catalytically active polyolefin powder into the vapor phase polymerization vessel is called a "seed powder." The seed powder may contain substances other than a polyolefin, such as organic aluminum and an antistatic agent. The median diameter of the seed powder, namely, β in the above formula (1), is preferably 275 μm to 3000 μm, more preferably 350 μm to 2000 μm, and even more preferably 500 μm to 1200 μm. The seed powder is preferably a powder of a polyolefin having monomer units based on an a-olefin having 2 to 12 carbon atoms, and more preferably is of the same type as the powder of the polyolefin obtained by the production method of the present invention. Herein, a median diameter is a median diameter on weight basis measured using a laser diffraction particle size distribution analyzer. The median diameter is determined by the following method. A powder is dispersed in a dry state, and then particle size distribution defined by the particle diameter and the frequency (% by weight) of a powder mass is measured by a laser diffraction particle size distribution analyzer where the overall weight of the powder mass is taken as 100% by weight. Integral distribution is determined from the particle size distribution, and the particle diameter that affords an integral distribution of 0.5 (50% by weight) is the median diameter.

In the present invention, the median diameter of a seed powder is the median diameter of a seed powder that is present within a vapor phase polymerization vessel just before a catalytically active polyolefin powder is fed to the vapor phase polymerization vessel.

In one embodiment, the seed powder comprises a catalyst and a polyolefin, and in another embodiment, the seed powder preferably comprises a catalyst and a polyolefin in an amount of 3500 kg or more per kilogram of the catalyst. The content of the polyolefin per kilogram of the catalyst is more preferably 10000 kg or more, and even more preferably 15000 kg or more.

When using a vapor phase fluidized bed reactor as the vapor phase polymerization vessel, it is preferred that a seed powder have formed a fluidized bed before a catalytically active polyolefin powder is fed to the vapor phase fluidized bed reactor. In this case, as to the amount of the seed powder that is present within the vapor phase fluidized bed reactor before the catalytically active polyolefin powder is fed to the vapor phase fluidized bed reactor, the ratio L/D is preferably 0.3 to 10.0, and more preferably 0.5 to 5.0. Herein, D denotes the diameter (unit: m) of the vapor phase fluidized bed reactor, and L denotes the distance between the top of a fluidized bed formed by the seed powder and the gas containing an olefin and the dispersion plate, namely, the height (unit: m) of the fluidized bed.

When using a horizontal vapor phase reactor equipped with a stirrer as the vapor phase polymerization vessel, as to the amount of the seed powder that is present within the horizontal vapor phase reactor equipped with a stirrer before the catalytically active polyolefin powder is fed to the horizontal vapor phase reactor, the ratio l/d is preferably 0.1 to 1.0, and more preferably 0.2 to 0.8. Herein, d denotes the diameter (unit: m) of the horizontal vapor phase reactor, and l denotes the packing height (unit: m) of the seed powder.

In the present invention, "polymerization of an olefin in a vapor phase polymerization vessel is commenced" means that continuous or intermittent feed of a catalytically active polyolefin powder into a vapor phase polymerization vessel is commenced from the state where the catalytically active polyolefin powder is not fed into the vapor phase polymerization vessel continuously or intermittently. Specifically, it means that feed of the catalytically active polyolefin powder into the vapor phase polymerization vessel performed continuously or intermittently at intervals shorter than one hour is commenced from the state where the catalytically active polyolefin powder has not been fed into the vapor phase polymerization vessel for one hour or more. Specific examples includes commencing polymerization in a vapor phase polymerization vessel after periodical maintenance of the vessel, and commencing polymerization in a vapor phase polymerization vessel after once stopping polymerization by stopping the feed of a catalytically active polyolefin powder into the vapor phase polymerization vessel.

The median diameter of the catalytically active polyolefin powder to be fed into the vapor phase polymerization vessel, namely, $\alpha$ in the above formula (1), is preferably 550 μm to 3000 μm, more preferably 550 μm to 2000 μm, and even more preferably 550 μm to 1000 μm. In one embodiment, the catalytically active polyolefin powder to be fed into the vapor phase polymerization vessel comprises a catalyst and a polyolefin, and in another embodiment, the catalytically active polyolefin powder to be fed into the vapor phase polymerization vessel preferably comprises a catalyst and a polyolefin in an amount of 3500 kg or more per kilogram of the catalyst. The content of the polyolefin per kilogram of the catalyst is more preferably 4000 kg or more, and even more preferably 5000 kg or more. The content of the polyolefin per kilogram of the catalyst is preferably 100000 kg or less, more preferably 75000 kg or less, even more preferably 50000 kg or less, and still even more preferably 15000 kg or less. Herein, the median diameter is a median diameter on weight basis determined using a laser diffraction particle size distribution analyzer. The median diameter of the catalytically active polyolefin powder to be fed into the vapor phase polymerization vessel is determined by the same method as that for determining the median diameter of the seed powder.

Where the average feed amount (unit: kg/hour) of the catalytically active polyolefin powder to be fed into the vapor phase polymerization vessel during a period of 8 hours beginning with the commencement of polymerization of an olefin in the vapor phase polymerization vessel is represented by Q and the amount (unit: kg) of the seed powder that is present within the vapor phase polymerization vessel before the catalytically active polyolefin powder is fed into the vapor phase polymerization vessel is represented by q, the ratio q/Q is preferably 0.5 to 30.0, and more preferably 2.0 to 15.0.

From the viewpoint of being easier to suppress generation of lumps of a polyolefin powder, $\beta/\alpha$, which is the ratio of the above-mentioned $\alpha$ to the above-mentioned $\beta$, is preferably 0.5 or more, more preferably 0.7 or more, and even more preferably 1.0 or more. The ratio $\beta/\alpha$ a is preferably less than 2.0, and more preferably 1.9 or less.

In a step of commencing polymerization of an olefin by feeding a catalytically active polyolefin powder into a vapor phase polymerization vessel which contains a polyolefin powder and through which a gas containing an olefin circulates, the linear gas velocity of the gas containing an olefin in the vapor phase polymerization vessel (B in the above formula (1)) means the average linear gas velocity during a period of 8 hours beginning with the commencement of polymerization of an olefin.

From the viewpoint of being easier to suppress generation of lumps of a polyolefin powder, the linear gas velocity of the gas containing an olefin is preferably 0.01 m/sec to 2 m/sec, more preferably 0.05 m/sec to 1 m/sec, and even more preferably 0.15 m/sec to 0.5 m/sec. The linear gas velocity of the gas containing an olefin is calculated from the following formula.

> Linear gas velocity (m/sec) of gas containing olefin=
> [Gas flow rate (unit: m³/sec) of the gas containing olefin in vapor phase polymerization vessel]/[Area (unit: m²) of a horizontal cross-section of the vapor phase polymerization vessel taken at the height of a surface of a layer formed by the polyolefin powder existing in the vapor phase polymerization vessel]

The "surface of a layer formed by the polyolefin powder existing in the vapor phase polymerization vessel" refers herein to an interface between the layer formed by the polyolefin powder existing in the vapor phase polymerization vessel and the vapor phase portion lying above the layer.

While the type of the olefin to be used in the present invention is not limited, $\alpha$-olefins having 1 to 12 carbon atoms are preferred and examples thereof include ethylene, propylene, 1-butene, 1-hexene, and 4-methyl-1-pentene. Ethylene, propylene, and 1-butene are preferred as the olefin.

The polyolefin to be obtained by the method of the present invention is preferably a polyolefin comprising monomer units based on one or more $\alpha$-olefins selected from $\alpha$-olefins having 1 to 12 carbon atoms. The polyolefin to be obtained by the method of the present invention is preferably a polyolefin comprising monomer units based on propylene. The polyolefin can be either a homopolymer or a copolymer. The homopolymer is a polymer made up of monomer units based on one type of $\alpha$-olefin selected from the group consisting of $\alpha$-olefins having 1 to 12 carbon atoms. Examples of the copolymer include a copolymer comprising monomer units based on ethylene and monomer units based on one or more types of $\alpha$-olefin selected from the group consisting of $\alpha$-olefins having 3 to 12 carbon atoms, and a copolymer comprising monomer units based on propylene and monomer units based on one or more types of $\alpha$-olefin having 4 to 12 carbon atoms. Examples of the copolymer comprising monomer units based on ethylene and monomer units based on one or more types of $\alpha$-olefin selected from the group consisting of $\alpha$-olefins having 3 to 12 carbon atoms include an ethylene-propylene copolymer, an ethylene-1-butene copolymer, an ethylene-1-hexene copolymer, and an ethylene-4-methyl-1-pentene copolymer. Examples of the copolymer comprising monomer units based on propylene and monomer units based on one or more types of α-olefin having 4 to 12 carbon atoms include a propylene-1-butene copolymer. In the present invention, the polyolefin may be a composition comprising a homopolymer and a copolymer.

In the step of feeding a catalytically active polyolefin powder into a vapor phase polymerization vessel which contains a polyolefin powder and through which a gas comprising an olefin is being circulated, thereby commencing polymerization of an olefin, the type of the olefin contained in the gas that circulates through the vapor phase polymerization vessel before the commencement of the polymerization may be the same as or different from the type of the olefin to be polymerized. When the olefins are of different types and when commencing polymerization by feeding a catalytically active polyolefin powder into a vapor phase polymerization vessel, an olefin of the different type from the olefin contained in the circulating gas can be fed into the vapor phase polymerization vessel.

Examples of the catalyst to be used in order to produce a catalytically active polyolefin powder to be fed into a vapor phase polymerization vessel include a Ziegler-Natta catalyst and a metallocene based catalyst, and preferred is a Ziegler-Natta catalyst. Examples of the Ziegler-Natta catalyst include Ti—Mg based catalysts, such as a catalyst comprising a solid catalyst component produced by bringing a titanium compound into contact with a magnesium compound, and a catalyst comprising a solid catalyst component produced by bringing a titanium compound into contact with a magnesium compound, an organoaluminum compound and, according to necessity, a third component such as an electron donating compound; a catalyst comprising a solid catalyst component produced by bringing a titanium compound into contact with a magnesium compound, an organoaluminum compound and, according to necessity, a third component, such as an electron donating compound is preferred, and a catalyst comprising a solid catalyst component produced by bringing a titanium compound into contact with a magnesium compound, an organoaluminum compound, and an electron donating compound is more preferred (see, for example, JP-A-61-218606, JP-A-61-287904, JP-A-7-216017, and JP-A-2004-67850). The catalyst may also be a catalyst having been preliminarily activated by bringing it into contact with a small amount of olefin.

The catalytically active polyolefin powder to be fed into a vapor phase polymerization vessel may be produced by a vapor phase polymerization method, or alternatively may be produced by a bulk polymerization method or a solvent polymerization method. The polymerization vessel in which the aforementioned catalytically active polyolefin powder is produced and the vapor phase polymerization vessel to which the catalytically active polyolefin powder is fed may have been connected to each other. In this case, the method for producing a polyolefin of the present invention comprises a step of producing a catalytically active polyolefin powder. In addition, the method of the present invention may comprise a step of removing an unreacted monomer, hydrogen, a solvent for diluting a catalyst, etc. to be performed between the step of producing the aforementioned catalytically active polyolefin powder and the step of feeding the catalytically active polyolefin powder into the vapor phase polymerization vessel.

When the polymerization vessel in which the aforementioned catalytically active polyolefin powder is produced and the vapor phase polymerization vessel to which the catalytically active polyolefin powder is fed are tandem arranged, examples of the method of commencing polymerization of an olefin include the following two methods.

(Method 1) A valve provided in a pipe connecting the polymerization vessel in which the catalytically active polyolefin powder is produced with the vapor phase polymerization vessel is closed before feeding the catalytically active polyolefin powder into the vapor phase polymerization vessel, and the catalytically active polyolefin powder is once produced under that state without using the vapor phase polymerization vessel. Then, the valve in the pipe is opened and the catalytically active polyolefin powder is fed into the vapor phase polymerization vessel, and thereby polymerization of an olefin is commenced.

(Method 2) A valve provided in a pipe connecting the polymerization vessel in which the catalytically active polyolefin powder is produced with the vapor phase polymerization vessel is opened in a state where no catalyst is fed into the polymerization vessel in which the catalytically active polyolefin powder is produced. Then, a catalyst or a catalytically active polyolefin powder is fed into the polymerization vessel in which the catalytically active polyolefin powder is produced, thereby commencing the production of the catalytically active polyolefin powder. Simultaneously, a catalytically active polyolefin powder is fed into the vapor phase polymerization vessel, thereby commencing the polymerization of an olefin.

The polymerization temperature in the vapor phase polymerization vessel is usually 20° C. to 150° C., preferably 35° C. to 95° C., and more preferably 50° C. 90° C. The polymerization pressure in the vapor phase polymerization vessel is usually atmospheric pressure or more, preferably 0.5 MPaG to 3 MPaG, and more preferably 0.7 MPaG to 2.5 MPaG. Herein, the pressure represented with the unit of MPaG represents a pressure relative to the atmospheric pressure. The linear gas velocity of the gas containing an olefin in the vapor phase polymerization vessel is usually 0.01 m/sec to 2 m/sec, preferably 0.05 m/sec to 1 m/sec, and more preferably 0.15 m/sec to 0.5 m/sec.

In one embodiment, the method for producing a polyolefin of the present invention comprises, in addition to the step of commencing polymerization of an olefin, a step of polymerizing the olefin within the vapor phase polymerization vessel.

In the present invention, when using a bulk polymerization method or a solvent polymerization method, the polymerization temperature in such a polymerization method is usually 20° C. to 150° C., and preferably 35° C. to 95° C. The polymerization pressure is usually atmospheric pressure or more; from the perspective that the efficiency of polyolefin production is higher, it is preferably 0.5 MPa or more, and more preferably 1.0 MPa or more.

The method for producing a polyolefin of the present invention may further comprise a step of performing a post-treatment after polymerization. Examples of the post-treatment step include a step of deactivating a catalyst, a step of removing a solvent or an unreacted olefin, a step of drying a polyolefin powder, and a granulation step. The temperature at which the step of performing the post-treatment is carried out is usually 25° C. to 120° C., preferably 50° C. to 90° C. The pressure at which the step of performing the post-treatment is carried out is usually atmospheric pressure to 1 MPa, preferably atmospheric pressure to 0.2 MPa.

EXAMPLES

The present invention is described in more detail below with reference to examples and a comparative example.

The values of the items in the examples and the comparative example were measured by the following methods.

<Median Diameter of Powder>

Using a laser diffraction particle size distribution analyzer "HELOS & RODOS System" manufactured by SYMPATEC, particles were dispersed in a dry state and then the particle size distribution thereof on weight basis was measured, and thereby a median diameter was determined.

<Intrinsic Viscosity ([η])>

Using an Ubbelohde viscometer, the viscosities of sample solutions with prescribed concentrations were measured in Tetralin at 135° C. From the measurements obtained, the intrinsic viscosity of the sample was determined by calculation based on the extrapolation method described in "Kobunshi Yoeki (Polymer Solution), Kobunshi Jikkengaku (Polymer Experiment Study) Vol. 11" page 491 (published by Kyoritsu Shuppan Co., Ltd., 1982).

<5Φ Lump Ratio>

A polypropylene powder obtained as a final product was passed through a sieve with 5-mm openings and the weight of the particles remaining on the sieve was measured and the ratio of the particles remaining on the sieve was calculated from the following formula.

5Φ lump ratio (weight ppm)=[Weight (mg) of particles remaining on the sieve]/[Overall weight (kg) of the polypropylene subjected to sieving]

<Evaluation of Operability at Commencement of Continuous Polymerization>

Evaluation of operability at commencement of continuous polymerization was performed by comparing the 5Φ lump ratio of each polypropylene obtained during a period of 8 hours beginning with the commencement of continuous polymerization in a vapor phase polymerization vessel. If the 5Φ lump ratio is 30 weight ppm or less, it was judged that the continuous polymerization in the vapor phase polymerization vessel was commenced stably.

<Gas Concentration of Vapor Phase Portion in Vapor Phase Polymerization Vessel>

The gas concentration of the vapor phase portion in a vapor phase polymerization vessel was measured by gas chromatography. GC-2014 manufactured by Shimadzu Corporation was used as a gas chromatography analyzer.

Example 1

[Synthesis of Solid Catalyst Component]

The atmosphere in a 200-liter SUS reactor equipped with a stirrer was replaced by nitrogen, and then 80 L of hexane, 6.55 mol of titanium tetrabutoxide, 2.8 mol of diisobutyl phthalate, and 98.9 mol of tetrabutoxysilane were charged thereinto to form a homogeneous solution. Subsequently, 51 L of a solution of butyl magnesium chloride with a concentration of 2.1 mol/L in diisobutyl ether was dropped slowly over 5 hours while maintaining the temperature in the reactor at 5° C. After completion of the dropping, stirring was continued at room temperature for 1 hour, followed by solid-liquid separation at room temperature. The resulting solid was washed three times with 70 L of toluene at room temperature and subsequently re-slurried with toluene, and then toluene was discharged so that the slurry concentration would become 0.6 kg/L. Then, a mixed liquid of 8.9 mol of di-n-butyl ether and 274 mol of titanium tetrachloride was added and then 20.8 mol of phthaloyl dichloride was further added and a reaction was carried out at 110° C. for 3 hours. After completion of the reaction, the resulting solid was washed twice with 90 L of toluene at 95° C. and subsequently re-slurried with toluene, and then the slurry concentration was adjusted to 0.6 kg/L. Then, 3.13 mol of diisobutyl phthalate, 8.9 mol of di-n-butyl ether and 137 mol of titanium tetrachloride were added and a reaction was carried out at 105° C. for 1 hour. After completion of the reaction, solid-liquid separation was carried out at that temperature. The resulting solid was washed twice with 90 L of toluene at 95° C. and subsequently re-slurried with toluene, and then the slurry concentration was adjusted to 0.6 kg/L. Then, 8.9 mol of di-n-butyl ether and 137 mol of titanium tetrachloride were added and a reaction was carried out at 95° C. for 1 hour. After completion of the reaction, solid-liquid separation was carried out at that temperature. The resulting solid was washed three times with 90 L of toluene at 95° C. and subsequently re-slurried with toluene, and then the slurry concentration was adjusted to 0.6 kg/L. Then, 8.9 mol of di-n-butyl ether and 137 mol of titanium tetrachloride were added and a reaction was carried out at 95° C. for 1 hour. After completion of the reaction, solid-liquid separation was carried out at that temperature. The resulting solid was washed three times with 90 L of toluene at 95° C. and additionally three times with 90 L of hexane at room temperature, then dried under reduced pressure, affording 11.0 kg of a solid catalyst component. The solid catalyst component comprised 1.89% by weight of titanium atoms, 20% by weight of magnesium atoms, 8.6% by weight of phthalate, 0.05% by weight of ethoxy groups, and 0.21% by weight of butoxy groups, and had good particle properties with no fine powder.

[Preliminary Activation of Solid Catalyst Component]

A 3-liter SUS autoclave equipped with a stirrer was charged with 2.0 L of fully dehydrated and degassed n-hexane, 40 mmol of triethylaluminum, 4.0 mmol of cyclohexylethyldimethoxysilane, and 25 g of the above-described solid catalyst component. While maintaining the temperature in the vessel at 5 to 15° C., 87.5 g of propylene was continuously fed over 10 minutes to perform preliminary activation. Then, the resulting slurry of a solid catalyst component was transferred to a stainless steel autoclave of 200 L in capacity equipped with a stirrer, diluted by the addition of 140 L of liquid butane, and stored at a temperature not higher than 5° C.

[Polymerization]

Using a polymerization apparatus in which a 163-liter SUS polymerization vessel equipped with a stirrer as a first polymerization vessel and a 1-m³ vapor phase fluidized bed reactor equipped with a stirrer as a second polymerization vessel were tandem arranged, continuous polymerization in tandem arranged twin vessels was carried out.

[First Polymerization Vessel]

To the SUS polymerization vessel was fed 26 kg/hour of liquefied propylene as well as 0.67 g/hour of the solid catalyst component prepared by the above-described method and having been preactivated, 28 mmol/hour of triethylaluminum, and 3.5 mmol/hour of cyclohexylethyldimethoxysilane. Then, slurry polymerization using the liquefied propylene as a medium was continued at a polymerization temperature of 70° C. and a polymerization pressure of 3.1 MPaG under such conditions that the amount of slurry substantially staying within the vessel was maintained at 80 L. Thus, 4.4 kg/hour of a polypropylene powder was produced. The weight of the polypropylene contained in the obtained polypropylene powder per kilogram of the catalyst was 6567 kg, and the polypropylene powder had a median diameter of 595 μm and had catalyst activity.

[Second Polymerization Vessel]

To the vapor phase fluidized bed reactor was fed beforehand 45 kg of a catalytically activated polypropylene powder, and then the temperature of the polypropylene powder was adjusted to 70° C. and the pressure in the reactor was adjusted to 1.7 MPaG, and a gas containing propylene and hydrogen was fed into and circulated through the reactor so that the linear gas velocity would be 0.19 m/sec. Subsequently, the first polymerization vessel and the second polymerization vessel were connected and then the slurry containing the propylene powder obtained in the first polymerization vessel was fed to the second polymerization vessel without performing deactivation, thereby commencing continuous polymerization in tandem arranged twin vessels. The median diameter of the polypropylene powder held in the second polymerization vessel at the time of commencement of the continuous polymerization was 627 μm. After the commencement of the continuous polymerization, the polypropylene was continuously transferred to a post-treatment step from the second polymerization vessel so that the amount of the polypropylene powder held in the second polymerization vessel would become 45 kg without changing the conditions of the second polymerization vessel from the conditions before the commencement of the continuous polymerization, and drying of the polypropylene and the deactivation of the catalyst were carried out. The 5Φ lump ratio of the polypropylene obtained during a period of 8 hours beginning with the commencement of the continuous polymerization in tandem arranged twin vessels was 19 weight ppm, and continuous polymerization in tandem arranged twin vessels was commenced stably. The conditions and the results of the continuous polymerization in tandem arranged twin vessels are shown in Table 1.

Example 2

[Polymerization]

Continuous polymerization in tandem arranged twin vessels was performed in the same manner as Example 1 using a 163-liter SUS reaction vessel equipped with a stirrer as a second polymerization vessel and using a 1-m$^3$ vapor phase fluidized bed reactor equipped with a stirrer as a first polymerization vessel.

[Preparation for the Commencement of Continuous Polymerization in Tandem Arranged Twin Vessels]

A vapor phase fluidized bed reactor as a second polymerization vessel was charged with 35 kg of a catalytically active polypropylene powder, and then the temperature of the polypropylene powder was adjusted to 90° C. and the pressure in the reactor was adjusted to 2.0 MPaG, and a gas containing propylene and hydrogen was fed into the and circulated through the reactor so that the linear gas velocity would be 0.19 m/sec. Subsequently, to the SUS polymerization vessel as the first polymerization vessel was fed 30 kg/hour of liquefied propylene as well as 60 mmol/hour of triethylaluminum and 7.6 mmol/hour of cyclohexylethyldimethoxysilane. A liquid containing liquefied propylene was transferred continuously from the first polymerization vessel to the second polymerization vessel so that the polymerization temperature, the polymerization pressure, and the liquid amount in the first polymerization vessel would be held at 60° C., 2.6 MPaG, and 80 L.

[Commencement of Continuous Polymerization in Tandem Aranged Twin Vessels]

Then, a solid catalyst component synthesized and preliminarily activated in the same manner as in Example 1 was commenced to feed to the first polymerization vessel at a rate of 2.0 g/hour. Slurry polymerization using liquefied propylene as a medium was thereby performed in the first polymerization vessel, and a slurry containing a polypropylene powder was transferred from the first polymerization vessel to the second polymerization vessel, and thus continuous polymerization in tandem arranged twin vessels was commenced. The amount of the polypropylene powder obtained in the first polymerization vessel was 10.1 kg/hour, and the weight of the polypropylene contained in the polypropylene powder per kilogram of the catalyst was 5049 kg. The polypropylene powder had a median diameter of 561 μm and had catalyst activity. The median diameter of the polypropylene powder held in the second polymerization vessel at the time of commencement of the continuous polymerization was 1020 μm. After the commencement of the continuous polymerization, the polypropylene was continuously transferred to a post-treatment step from the second polymerization vessel so that the amount of the polypropylene powder held in the second polymerization vessel would become 55 kg without changing the conditions of the second polymerization vessel from the conditions before the commencement of the continuous polymerization except changing the amount of the polypropylene powder held in the reactor, and drying of the polypropylene and the deactivation of the catalyst were carried out. The 5Φ lump ratio of the polypropylene obtained during a period of 8 hours beginning with the commencement of the continuous polymerization in tandem arranged twin vessels was 14 weight ppm, and continuous polymerization in tandem arranged twin vessels was commenced stably. The conditions and the results of the continuous polymerization in tandem arranged twin vessels are shown in Table 1.

Comparative Example 1

[Polymerization]

Continuous polymerization in tandem arranged twin vessels was performed in the same manner as Example 1 using a 163-liter SUS reaction vessel equipped with a stirrer as a second polymerization vessel and using a 1-m$^3$ vapor phase fluidized bed reactor equipped with a stirrer as a first polymerization vessel.

[Preparation for the Commencement of Continuous Polymerization in Tandem Arranged Twin Vessels]

To a vapor phase fluidized bed reactor as a second polymerization vessel was fed 35 kg of a catalytically active polypropylene powder, and then the temperature of the polypropylene powder was adjusted to 83° C. and the pressure in the reactor was adjusted to 1.9 MPaG, and a gas containing propylene and hydrogen was fed into the and circulated through the reactor so that the linear gas velocity would be 0.08 m/sec.

Subsequently, to the SUS polymerization vessel as the first polymerization vessel was fed 50 kg/hour of liquefied propylene as well as 60 mmol/hour of triethylaluminum and 7.8 mmol/hour of cyclohexylethyldimethoxysilane. A liquid containing liquefied propylene was transferred continuously from the first polymerization vessel to the second polymerization vessel so that the polymerization temperature, the polymerization pressure, and the liquid amount in the first polymerization vessel would be held at 60° C., 2.5 MPaG, and 80 L.

pylene powder held in the reactor, and drying of the polypropylene and the deactivation of the catalyst were carried out. The 5Φ lump ratio of the polypropylene obtained during a period of 8 hours beginning with the commencement of the continuous polymerization in tandem arranged twin vessels was 51 weight ppm, and many lumps were contained in the polypropylene powder. The conditions and the results of the commencement of continuous polymerization in tandem arranged twin vessels are shown in Table 1.

TABLE 1

| | | | | Example 1 | Example 2 | Comparative Example |
|---|---|---|---|---|---|---|
| First polymerization vessel | | Median diameter of polypropylene powder (α) | μm | 595 | 561 | 507 |
| | | Polymerized amount per kilogram of catalyst | kg | 6567 | 5049 | 3162 |
| | | Polymerized amount per unit time | kg/hr | 4.4 | 10.1 | 7.6 |
| | | [η] | dl/g | 7.3 | 7.2 | 7.3 |
| Second vessel | At the commencement of continuous polymerization in tandem arranged twin vessels | Amount of polypropylene powder held in fluidized bed | kg | 45 | 35 | 35 |
| | | Linear gas velocity of gas containing olefin (B) | m/sec | 0.19 | 0.19 | 0.08 |
| | | Median diameter of polypropylene powder held in reactor (β) | μm | 627 | 1020 | 1020 |
| | | β/α | μm/μm | 1.1 | 1.8 | 2.0 |
| | | L/D * 1 | m/μm | 1.1 | 0.9 | 0.9 |
| | | q/Q * 2 | hour | 10.2 | 3.5 | 4.6 |
| | | β/(αB) | sec/m | 6 | 10 | 25 |
| | During stable operation of continuous polymerization in tandem arranged twin vessels | Amount of polypropylene powder held in fluidized bed | kg | 45 | 55 | 55 |
| | | Linear gas velocity of gas containing olefin | m/sec | 0.19 | 0.19 | 0.08 |
| Polypropylene obtained | | Polymerized amount per kilogram of catalyst | kg | 20567 | 17475 | 15222 |
| | | Polymerized amount per unit time | kg/hr | 13.8 | 35.0 | 36.8 |
| | | Median diameter of polypropylene powder | μm | 958 | 821 | 924 |
| | | [η] | dl/g | 2.9 | 2.7 | 2.4 |
| Evaluation of operability at commencement of continuous polymerization in tandem arranged twin vessels | | 5Φ lump ratio of polypropylene obtained during a period of 8 hours beginning with the commencement of continuous polymerization in tandem arranged twin vessels | wt. ppm | 19 | 14 | 51 |

L/D * 1: Ratio of L to D, where L denotes the height (unit: m) of a fluidized bed above a dispersion plate, and D denotes the diameter (unit: m) of a vapor phase fluidized bed reactor in a state where a fluidized bed has been formed, by circulating gas, from a polypropylene powder existing in a vapor phase polymerization vessel before feeding a catalytically active polypropylene powder into the vapor phase polymerization vessel.

q/Q * 2: Ratio of q to Q, where Q denotes the average feed amount (unit: kg/hr) of a catalytically active polypropylene powder fed into a vapor phase polymerization vessel during a period of 8 hours beginning with the commencement of polymerization of propylene in the vapor phase polymerization vessel, and q denotes the amount (unit: kg) of a polypropylene powder existing in the vapor phase polymerization vessel before feeding the catalytically active polypropylene powder fed into the vapor phase polymerization vessel.

[Commencement of Continuous Polymerization in Tandem Arranged Twin Vessels]

Then, a solid catalyst component synthesized and preliminarily activated in the same manner as in Example 1 was commenced to feed to the first polymerization vessel at a rate of 2.4 g/hour. Slurry polymerization using liquefied propylene as a medium was thereby performed in the first polymerization vessel, and a slurry containing a polypropylene powder was transferred from the first polymerization vessel to the second polymerization vessel, and thus continuous polymerization in tandem arranged twin vessels was commenced. The amount of the polypropylene powder obtained in the first polymerization vessel was 7.6 kg/hour, and the weight of the polypropylene contained in the polypropylene powder per kilogram of the catalyst was 3167 kg. The polypropylene powder had a median diameter of 507 μm. The median diameter of the polypropylene powder held in the second polymerization vessel at the time of commencement of the continuous polymerization was 1020 μm. After the commencement of the continuous polymerization, the polypropylene was continuously transferred to a post-treatment step from the second polymerization vessel so that the amount of the polypropylene powder held in the second polymerization vessel would become 55 kg without changing the conditions of the second polymerization vessel from the conditions before the commencement of the continuous polymerization except changing the amount of the polypro-

The invention claimed is:

1. A method for producing a polyolefin, comprising a step of feeding a catalytically active polyolefin powder into a vapor phase polymerization vessel which contains a polyolefin powder and through which a gas comprising an olefin is being circulated, thereby commencing polymerization of an olefin, wherein the following formula (1) is satisfied:

$$0.5 < \beta/(\alpha B) < 24.0 \quad (1)$$

in the above formula (1),
- α represents the median diameter (unit: μm) of the catalytically active polyolefin powder to be fed into the vapor phase polymerization vessel,
- β represents the median diameter (unit: μm) of the polyolefin powder that is contained in the vapor phase polymerization vessel before the feeding of the catalytically active polyolefin powder into the vapor phase polymerization vessel, and
- B represents the linear gas velocity (unit: m/sec) of the gas containing an olefin within the vapor phase polymerization vessel.

2. The method for producing a polyolefin of claim 1, wherein the ratio of the β to the α, β/α, is not less than 0.5 and less than 2.0.

3. The method for producing a polyolefin of claim 1, wherein the catalytically active polyolefin powder to be fed into the vapor phase polymerization vessel contains a catalyst and a polyolefin in an amount of 3500 kg or more per kilogram of the catalyst.

4. The method for producing a polyolefin of claim 1, wherein the $\alpha$ is 550 μm or more.

* * * * *